UNITED STATES PATENT OFFICE.

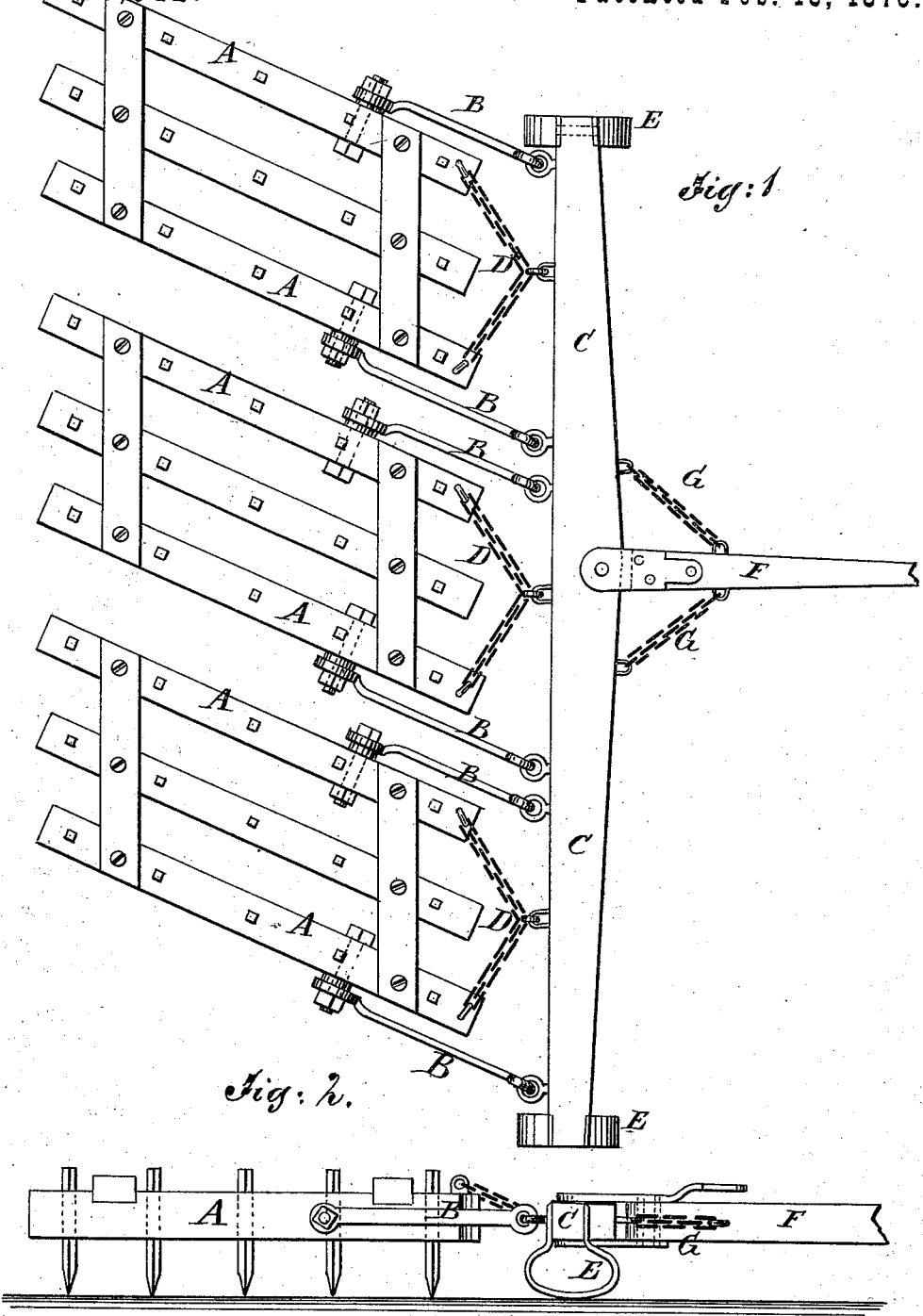

WILLIAM HORNS AND WILLIAM C. BUDROW, OF OGDEN, IOWA.

IMPROVEMENT IN HARROWS.

Specification forming part of Letters Patent No. 173,542, dated February 15, 1876; application filed July 24, 1875.

*To all whom it may concern:*

Be it known that we, WILLIAM HORNS and W. C. BUDROW, of Ogden, in the county of Boone and State of Iowa, have invented a new and useful Improvement in Harrow, of which the following is a specification:

Figure 1 is a top view of my improved harrow. Fig. 2 is a side view of the same.

Similar letters of reference indicate corresponding parts.

The object of this invention is to furnish an improved harrow, which shall be so constructed as to run level, and have all its parts do their proper work, however uneven the land may be, which will prevent the evener from dropping to the soil should a part of the harrow be raised to clear it of obstructions, and which will prevent the team from backing or turning upon the harrow.

The invention consists in the combination of the pivoted bars and the chains with the sections of the harrow and with the evener.

A represents the frame of the harrow, which is made in two or three parts or sections. To the side bars of the sections A, at any desired point between their forward ends and centers, but preferably toward their centers, are pivoted the rear ends of the bars B by bolts or other adjustable means. The forward ends of the bars B are pivoted to the evener C by eyebolts or other convenient means.

To the forward ends of the side bars of the sections A are attached the ends of short chains D, which are connected at their centers with the eveners C by eyebolts or other convenient means. The chains D are made of such a length as to be a little slack, and are designed to keep the forward ends of the sections A in their proper places.

To the under sides of the ends of the evener C are attached shoes E, to keep the said evener from dropping to the ground when a part of the harrow is raised from the ground to clear it of rubbish or other obstructions. The shoes E may be replaced by small wheels, if desired.

To the evener C is pivoted the end of the tongue F, so that it may have sufficient play to allow the harrow to adjust itself to the surface of the ground. The tongue F is braced with short chains G, which are made of such a length as to allow the tongue to have sufficient play.

Having thus described our invention, we claim as new and desire to secure by Letters Patent—

The combination of the pivoted bars B and the chains D with the sections A of the harrow, and with the evener C, substantially as herein shown and described.

WILLIAM HORNS.
W. C. BUDROW.

Witnesses:
R. ST. HELEN,
CHAS. BLAUFORD.